(12) United States Patent
Achten et al.

(10) Patent No.: US 7,572,861 B2
(45) Date of Patent: Aug. 11, 2009

(54) HXNBR-RUBBER AS A CROSS-LINKING AGENT

(75) Inventors: Dirk Achten, Köln (DE); Hans-Rafael Winkelbach, Burscheid (DE); Martin Mezger, Burscheid (DE)

(73) Assignee: Lanxess Deutschland GmbH, Leverkusen (DE)

( * ) Notice: Subject to any disclaimer, the term of this patent is extended or adjusted under 35 U.S.C. 154(b) by 0 days.

(21) Appl. No.: 11/977,310

(22) Filed: Oct. 24, 2007

(65) Prior Publication Data

US 2008/0108753 A1     May 8, 2008

Related U.S. Application Data

(62) Division of application No. 10/842,983, filed on May 11, 2004, now abandoned.

(30) Foreign Application Priority Data

May 15, 2003   (DE)   ................... 10321875

(51) Int. Cl.
*C08L 9/00*     (2006.01)
*C08L 9/02*     (2006.01)
*C08L 33/18*    (2006.01)
*C08L 47/00*    (2006.01)
*C08C 19/02*    (2006.01)

(52) U.S. Cl. ................. 525/230; 525/232; 525/233; 525/238

(58) Field of Classification Search ......... 525/230, 525/233, 338, 232, 238
See application file for complete search history.

(56) References Cited

U.S. PATENT DOCUMENTS

| 4,356,286 | A | * | 10/1982 | Bethea et al. | ............... | 525/183 |
| 4,857,632 | A |   | 8/1989  | Ahlberg et al. | .............. | 528/487 |
| 6,828,385 | B2 | * | 12/2004 | Gamlin et al. | .............. | 525/230 |
| 7,265,185 | B2 | * | 9/2007  | Guo et al. | .................... | 525/338 |
| 2003/0171500 | A1 |  | 9/2003  | Guo et al. | ................ | 525/329.1 |

OTHER PUBLICATIONS

Handbook of Adhesives and Sealants, (month unavailable) 2000, p. 700, Edward M. Petrie "Polybenzimidazole".
Handbook of Adhesives and Sealants, edited by B. Muller, first edition, by E.M. Petrie Material and Corrosion, 51(7) (month unavailable) 2000, p. 525 "Corrosion Books".

* cited by examiner

*Primary Examiner*—Nathan M Nutter
(74) *Attorney, Agent, or Firm*—Jennifer R. Seng

(57) ABSTRACT

The present invention relates to hydrogenated carboxylated nitrile-butadiene rubber (HXNBR), which contain molecularly dispersed triphenylphosphine, and which is useful as a cross-linking agent for elastomers, plastics and/or adhesive systems. The present invention also relates to products which are obtainable from the HXNBR having molecularly dispersed triphenylphosphine and elastomer, plastics and/or adhesive systems, a composition containing a HXNBR having molecularly dispersed triphenylphosphine and further non-molecularly dispersed activators, a process for the preparation of the composition as well as the use of HXNBR having molecularly dispersed triphenylphosphine, as an elasticizing agent for elastomer, plastics and/or adhesive systems.

9 Claims, No Drawings

HXNBR-RUBBER AS A CROSS-LINKING AGENT

This application is a divisional of U.S. patent application Ser. No. 10/842,983 filed May 11, 2004 now abandoned, the contents of which are hereby incorporated by reference in their entirety.

FIELD OF THE INVENTION

The present invention relates to the hydrogenated carboxylated nitrile-butadiene rubber (HXNBR) which contains molecularly dispersed triphenylphosphine as cross-linking agent for elastomers, plastics and/or adhesive systems and products which are obtainable from the HXNBR having molecularly dispersed triphenylphosphine and elastomer, plastics and/or adhesive systems. The present invention also relates to a composition containing HXNBR having molecularly dispersed triphenylphosphine and further non-molecularly dispersed activators, a process for the preparation of the composition as well as the use of HXNBR having molecularly dispersed triphenylphosphine as an elasticizing agent for elastomers, plastics and/or adhesive systems.

BACKGROUND OF THE INVENTION

There is a great need for compositions which are useful as cross-linking agents in totally disparate media such as elastomer, plastics and/or adhesive systems and which can optionally be used simultaneously as elasticizing agents in these media.

Various substances or compositions which can be used for one use in either an elastomer, a plastic or an adhesive system, respectively, are described in the Handbook of Adhesives and Sealants, (1999), 700 pp., Petrie, Edward M., as well as the Handbook of Adhesives and Sealants edited by Muller, B. first edition, by E. M. Petrie, Materials and Corrosion (2000), 51(7), 525.

For instance maleic anhydride-grafted EPM and EPDM derivatives are disclosed as elasticizing adhesive additions in small quantities.

The utilization of carboxylated nitrile rubber in elastomer mixtures/adhesive mixtures for improving the adhesive properties of elastomer to reinforcing materials prepared from, for example, polyamide, polyester, rayon, (galvanized) steel and aluminum is likewise described.

Furthermore, the co-vulcanization of epoxidized natural rubber with carboxylated nitrile rubber or maleic anhydride-grafted EPM as a cross-linking agent is disclosed.

The use of copolymers of acrylate and methacrylic esters with acrylic acid or methacrylic acid as coupling agents for PSA (pressure-sensitive adhesives) is described in the cited art.

The utilization of carboxylated polymers based on carboxylated nitrile rubber as additives for metal-to-metal bonding is likewise already known.

The use of, inter alia, liquid carboxylated nitrile rubber for elasticizing and impact modification of adhesives, epoxy resins as well as thermoplastics for utilization as (powder) adhesives and (powder) lacquers is also described in the cited art.

It is likewise disclosed that carboxylated polymers can be used as contact adhesives on account of their ability to form reversible ionic cross-linkages with MgO, which leads to an improvement in the initial adhesion rate at both high and low temperatures.

Furthermore, the use of polyethylene modified with carboxyl groups, as a hot melt as self-adhesive films and protective films is described.

A cross-linking or elasticizing of this type by direct reaction of the elastomer, plastics or adhesive systems with HXNBR rubber in the presence of activators such as triphenylphosphine and/or others is not known in the art. The utilization of HXNBR rubber which contains molecularly dispersed activators and optionally further activators, as a cross-linking agent and/or elasticizing agent is furthermore also not known.

The object of the present invention is therefore to provide a substance or a composition which, where required, enables peroxidic, photochemical, sulfur and ionic cross-linking reactions to take place as well as addition and condensation reactions with cross-linking-active and coupling-active groups of elastomer, plastics, and/or adhesives.

DETAILED DESCRIPTION OF THE INVENTION

The present invention relates to hydrogenated carboxylated nitrile-butadiene rubber (HXNBR), in which triphenylphosphine is molecularly dispersed, as a cross-linking agent for elastomer, plastics and/or adhesive systems.

The present invention is also directed HXNBR rubber having molecularly dispersed triphenylphosphine as a cross-linking agent, wherein from 0.1 to 10 wt. % of molecularly dispersed triphenylphosphine in the HXNBR rubber is preferred.

The present invention also includes HXNBR which contains molecularly dispersed triphenylphosphine and further contains, a non-molecularly dispersed, activator.

Cross-linking agent, wherein the elastomers, plastics and/or adhesive systems which are to be cross-linked can be selected from polyurethanes, polyureas, polyesters, polyamides, poly(meth)acrylates, polyepoxides, polyepichlorohydrin, the products prepared from bifunctional or polyfunctional epoxides, thiiranes, isocyanates or carbodiimides with bifunctional or polyfunctional amines, alcohols or formaldehyde-phenolic resins, rubbers which are cross-linked by way of radical generators, and ionically cross-linkable mixtures, are preferred.

The present invention also provides a product which is prepared by mixing a hydrogenated carboxylated nitrile-butadiene rubber (HXNBR) in which triphenylphosphine is molecularly dispersed, with an elastomer, plastic and/or adhesive systems.

A product in which the HXNBR rubber which contains molecularly distributed triphenylphosphine also can contain an additional non-molecularly dispersed activator.

The present invention also provides a composition containing
a) a hydrogenated carboxylated nitrile-butadiene rubber (HXNBR) in which triphenylphosphine is molecularly dispersed and
b) a non-molecularly dispersed activator.

The composition preferably comprises from 10 to 99.9 wt. % of the component a) and from 0.1 to 90 wt. % of the component b).

The activator of the composition is preferably selected from ethanolamine, primary aliphatic or aromatic amines, secondary aliphatic or aromatic amines, organic phosphorus compounds, acid catalysts and mixtures of these compounds.

The composition preferably contains from 0.1 to 10 wt. % of molecularly dispersed triphenylphosphine in the HXNBR rubber.

The composition preferably also contains from 0 to 90 wt. % of further additives selected from organic solvents, stabilizers, emulsifiers, water, plasticizers, processing aids and fillers.

The present invention also provides a process for the preparation of the composition, which includes
a) providing an HXNBR rubber which contains molecularly dispersed triphenylphosphine and has been prepared by hydrogenation of an XNBR rubber prepared by means of emulsion polymerization and
b) mixing the HXNBR rubber with further activators.

The present invention also provides the use of HXNBR rubber having molecularly dispersed triphenylphosphine, as an elasticizing agent for elastomers, plastics and/or adhesive systems.

The use of the HXNBR rubber as an elasticizing agent for elastomers, plastics and/or adhesive systems is preferable when the HXNBR rubber also contains further non-molecularly dispersed activator.

The composition according to the present invention contains from 10 to 99.9 wt. %, preferably 60 to 99.9 wt. %, of hydrogenated carboxylated nitrile-butadiene rubber (HXNBR) and from 0.1 to 90 wt. %, preferably 0.1 to 40 wt. %, of activator and from 0 to 90 wt. % of additives. The composition according to the present invention includes a mixture of HXNBR having molecularly dispersed triphenylphosphine, and further additional activators.

A hydrogenated carboxylated nitrile-butadiene rubber is understood to be any copolymers known to those skilled in the art, which are derived from the monomers butadiene, acrylonitrile, methacrylic acid as well as further acrylic and/or vinylic monomers which are prepared by an emulsion polymerization to obtain an XNBR (carboxylated nitrile-butadiene rubber), as described in WO-A 01/77185, and are subsequently hydrogenated to obtain the HXNBR. This method of preparation equips the HXNBR rubber in direct manner with a molecularly dispersed activator, triphenylphosphine. Activation for addition and condensation reactions is achieved with low concentrations of the activator on account of its molecular dispersion. The reactivity may be adjusted, controlled and increased by the addition of further quantities of activators.

Molecularly dispersed triphenylphosphine is understood to be a triphenyl-phosphine which is dissolved in the HNBR. The triphenylphosphine is dispersed such that no differences in concentration occur between HNBR and triphenylphosphine on a dimensional scale greater than 1 micrometer. By contrast, such a uniform dispersion cannot be achieved when triphenylphosphine is mixed mechanically into HNBR, with the quality of the dispersion of the triphenyl-phosphine in the HNBR being dependent on the duration of mixing, the mixing temperature as well as the general composition of the mixture.

The further acrylic and/or vinylic monomers are understood to be any acrylic and/or vinylic monomers known to those skilled in the art. The following are preferred: vinyl benzenes, acrylates, methacrylates as well as free acids thereof. The following are more preferred: styrene, divinyl-benzene, methyl acrylate, ethyl acrylate, butyl acrylate, 2-ethylhexyl acrylate, methacrylonitrile, acrylmethacylic acid, maleic anhydride, fumaric acid and itaconic acid.

Highly hydrogenated HXNBR rubbers are preferably used. "Highly hydrogenated" as applied to HXNBR rubbers is understood to mean having a double bond content of less than 40 double bonds per 1000 carbon atoms, preferably less than 15 double bonds per 1000 carbon atoms. Double bond content within the range 0.2 to 15 double bonds per 1000 carbon atoms is preferred.

The preparation of a highly hydrogenated HXNBR rubber is described in WO-A 01/77185. The HXNBR rubber is prepared starting from XNBR by hydrogenation in a solution process, with this being convertible subsequently to solid rubber. The monomer units may be distributed in both, random and in block manner. A random distribution is preferred.

The HXNBR rubber which is utilized in the composition according to the present invention and contains molecularly dispersed triphenylphosphine and can also be used without further addition of activators as an elasticizing agent and/or cross-linking-active component for elastomers, plastics and/or adhesive systems, has a nitrile group content within the range 10 to 50 wt. %, preferably within the range 15 to 45 wt. %, and a methacrylic acid content within the range 0.1 to 20 wt. %, preferably within the range 1 to 10 wt. %, in relation to the total proportion of HXNBR rubber.

The HXNBR rubber contains from 0.1 to 10 wt. %, preferably 0.1 to 5 wt. %, of molecularly dispersed triphenylphosphine.

In the composition according to the present invention a further activator can be added to the HXNBR rubber which already contains molecularly dispersed triphenylphosphine.

In order to increase the reactivity of the carboxyl groups for addition reactions with epoxides/isocyanates or condensation reactions with amines and alcohols, activators are frequently be added. The term "activators" is understood to be any activators known to those skilled in the art. Activators can also be utilized for XNBR rubbers are preferred. Basic or acid catalysts are preferred. The activator in the composition according to the present invention is preferably selected from acid catalysts such as para-toluenesulfonic acid, salicylic acid, activated $\alpha$-$Al_2O_3$ acid or silicic acid and basic, preferably aminic compounds such as ethanolamine, primary or secondary aliphatic amines, organic phosphorus compounds such as triphenylphosphine, organic phosphonium salts such as $R_3P^+$—$R^1$ having R=$C_{1-6}$-alkyl, Ph; R=—CH($CO_2$)—(CHR$^2$)$_n$$CO_2$H or —CHR$^3$(CHR$^2$)$_n$$CO_2$R$^4$X—, $R_2$=H; R=H, Me, $CO_2$H; $R^4$=H, $C_{1-6}$-alkyl; n=0-2; X—=anion and mixtures of these compounds. Ethanolamine, dodecylamine, triphenylphosphine, p-toluenesulfonic acid, $\alpha$-$Al_2O_3$ acid or silicic acid or mixtures of the same are more\preferred.

From 0 to 90 wt. %, preferably 0.001 to 80 wt. %, of further additives may be included in the composition according to the present invention prepared from HXNBR rubber which contains molecularly dispersed triphenylphosphine and has additional activator, and also in the HXNBR rubber which contains molecularly dispersed triphenylphosphine and has no additional activator. These further additives can be selected from organic solvents, stabilizers, emulsifiers, water and plasticizers, processing aids and fillers.

Preferred organic solvents are chlorobenzene, acetone, methyl ethyl ketone, methylene chloride, chloroform, tetrahydrofuran, toluene or mixtures of the same.

Preferred stabilizers are any antioxidants known to those skilled in the art. 2,2'-methylene-bis-(4-methyl-6-tert.-butylphenol), 2-mercaptobenzimidazole, N-isopropyl-N'-phenyl-paraphenylene diamine are more preferred.

Preferred emulsifiers are any emulsifiers known to those skilled in the art such as fatty acids and alkali metal and alkaline earth metal salts thereof, (disproportionated) rosin acids and salts thereof, alkylsulfonic acids and arylsulfonic acid, organic sulfates as well as the class of nonionic emulsifiers. The sodium stearates and potassium stearates, oleates, organic sodium and potassium sulfates and sulfonates and rosin acids are more preferred.

Preferred plasticizers are trioctyl phosphate, benzyloctyl adipate, polyphthalates, tri(2-ethylhexyl) trimellitate, aromatic polyetheresters and thioetheresters.

Preferred processing aids are stearyl amines and zinc stearate.

Preferred fillers are carbon black, silica, talcum, alumina silicat and calcium carbonate.

In order to prepare the composition according to the present invention the HXNBR rubber, which contains molecularly dispersed triphenylphosphine, is mixed with the additional activator in the manner known to those skilled in the art. Mixing rolls are preferably used for mixing, but internal mixers and compounding extruders are also possible, as is mixing in solution or in dispersion.

Both the HXNBR rubber having molecularly dispersed triphenylphosphine without additional activator and also the composition according to the present invention, in which the HXNBR rubber is utilized with molecularly dispersed triphenylphosphine and additional activators, can be used both as a cross-linking agent and as an elasticizing agent for elastomer, plastics and/or adhesive systems, since the HXNBR rubber, in each case having molecularly dispersed triphenylphosphine but with and without additional activator, also has, in addition to a cross-linking property, an elasticizing effect on elastomers, plastics and/or adhesive systems.

The term "elastomer" is understood to be any elastomers known to those skilled in the art. Any polymeric compounds having a glass transition point below room temperature (20° C.) are preferred. Polychloroprene, ethylene propylene diene rubber, polyacrylates, polybutadienes, polyacrylonitrile butadiene, fluororubbers, chlorosulfonated rubbers, halogenated and unhalogenated butyl rubber, and styrene butadiene rubber are preferred. The term "plastics" is understood as any thermoplastics and thermoset materials (cross-linked, non-meltable thermoplastics) known to those skilled in the art. The thermoplastics and/or thermoset materials selected from the group consisting of polyurethanes, polyureas, polyesters, polyamides, polyacrylates, polymethacrylates, polyepoxides, polyepichlorohydrins are preferred.

The term "adhesive systems" is understood to be any adhesives and/or adhesive systems as well as surfacing agents such as lacquers and coatings, which are known to those skilled in the art. Preferred adhesive systems include those prepared from bifunctional or polyfunctional epoxides/thiiranes/isocyanates/carbodiimides in combination with bifunctional or polyfunctional amines/alcohols/carboxylic acids, formaldehyde-phenolic resins, or products which arise from the reaction of cross-linkable functional (meth)acrylates and/or rubbers with radical generators. Adhesive systems are additionally understood to be ionic networks having basic frameworks selected from the group consisting of polyfunctional sulfonates, polyfunctional carboxylates, polyfunctional nitrogen compounds and polyfunctional phosphorus compounds or chelate compounds, which are reacted with strongly polar ions.

Radical generators are understood to be any initiators known to those skilled in the art, which can generate radicals. The radical generators selected from the group consisting of photoinitiators, peroxides, azides and redox initiators are preferred.

Cross-linkable functional (meth)acrylates are understood to be preferably hydroxyethyl methacrylate and zinc di(meth)acrylate.

Rubbers which can be reacted with the radical generators are understood to be preferably nitrile rubber, chloroprene rubber, ethylene-propylene-diene rubber, ethylene-acrylate rubber (AEM), fluororubber (FKM), chlorosulfonated polyethylene and styrene-butadiene rubber.

Ionic networks are understood to be combinations of polyfunctional sulfonates, carboxylates, polyfunctional nitrogen compounds, polyfunctional phosphorus compounds or polyfunctional chelate compounds having strongly polar ions. Strongly polar ions are understood to be monovalent and polyvalent ions.

Monovalent and polyvalent ions selected from the group consisting of H, Li, Mg, Ca, Al, Ba, Ti, Mn, Fe, Cu, Zn and Sn are understood to be preferred.

Preferred polyfunctional sulfonates are polystyrene sulfonic acid and chlorosulfonated polyethylene. Preferred carboxylates are carboxylated butadiene-nitrile rubber (NBR), carboxylated styrene-butadiene rubber (XSBR), maleic anhydride-grafted ethylene-propylene copolymer (EPM), ethylene-propylene-diene copolymer (EPDM) or polypropylene (PP) and ethylene-acrylate rubbers (AEM).

Polyfunctional nitrogen compounds and phosphorus compounds or chelate compounds are understood to be preferably polyvinyl pyrrolidone, polyphosphates, EDTA (ethylenediamine triacetic acid or the sodium salt of this acid) and nucleic acids.

In order to prepare a product from an elastomer, a plastic or an adhesive system and the HXNBR rubber having the molecularly dispersed triphenylphosphine or the composition according to the present invention prepared from HXNBR, which contains the molecularly dispersed triphenylphosphine and a further activator, the HXNBR rubber having molecularly dispersed triphenylphosphine can be present in solid form, in a suitable organic solvent or in an aqueous dispersion.

Advantageous features of the HXNBR rubber having molecularly dispersed triphenylphosphine both with and without additional activator are not only the elasticizing properties, but also the breadth of application, not only to a peroxidic but also to a photochemical, sulfur-induced or ionic cross-linking reaction as well as addition and condensation reactions with the cross-linking-active and coupling-active groups of the elastomers, plastics and/or adhesive systems which are cross-linked by the HXNBR rubber which contains molecularly dispersed triphenylphosphine, or by the composition according to the present invention. The HXNBR rubber having molecularly dispersed triphenylphosphine, to which activator has or has not been added, can furthermore be utilized as an elasticizing agent, compatibilizer and adhesive/lacquer raw material. A further advantage is the blends which are stable and resistant to oil, high temperatures, oxidation and chemicals, which are obtainable as a result of mixing with HXNBR rubber having molecularly dispersed triphenylphosphine or the composition according to the present invention.

On account of the multitude of linking possibilities, the HXNBR having molecularly dispersed triphenylphosphine as well as the HXNBR having molecularly dispersed triphenylphosphine and additional activator, affords a broad field of application, whereas in the conventional additives known hitherto in each case only one use for one field of application has been possible.

EXAMPLES

TABLE 1

Formulations for cross-linking HXNBR mixtures with different diisocyanates and polycarbodiimide, some in the presence of a peroxidic cross-linking system by comparison with standard HNBR rubber.

| | |
|---|---|
| Therban ® VP KA 8889 | hydrogenated acrylonitrile-butadiene-methacrylic acid terpolymer (HXNBR), from Bayer AG, acrylonitrile content 32 wt. % |
| Therban ® C3407 | hydrogenated acrylonitrile-butadiene copolymer (HNBR),, from Bayer AG, acrylonitrile content 34 wt. % |
| Vanfre ® VAM | organic phosphate ester, free acid, from Vanderbilt, density at 25° C. 0.97 $g/cm^3$ |
| Rhenofit ® DDA-70 | 70 wt. % diphenylamine derivative (dry liquid), from Rheinchemie |
| Corax ® N 550 | Fast Extruding Furnace (FEF) carbon black, from Degussa AG |
| Diplast ® TM8-10ST | stabilized trimellitate of $C_8$-$C_{19}$ linear alcohols, from Lonza, density 0.97 $g/cm^3$ |
| Vulkanox ® ZMB2 | zinc salt of 4- and 5-methyl-2-mercaptobenzimidazole, density 1.25 $g/cm^3$ at 25° C., from Bayer AG |
| Desmodur ® 15 | 1,5-naphthlylene diisocyanate, from Bayer AG |
| Desmodur ® 44 | 4,4'-diphenylmethane diisocyanate, from Bayer AG |
| Desmodur ® TT | dimeric 2,4-tolylene diisocyanate, from Bayer AG |
| Rhenogran ® P50 | 50 wt. % polycarbodiimide, density 1.01 $g/cm^3$ at 25° C., from Rheinchemie |
| Polydispersion ® T VC 40P | di-(tert.-butylperoxyisopropyl) benzene, 40 wt. %, from Rheinchemie, density 1.10 $g/cm^3$ at 25° C. |
| Perkalink ® 301 | triallyl isocyanurate, from Akzo Nobel, density 1.16 $g/cm^3$ at 25° C. |
| Triphenylphosphine* | dissolved molecularly in the rubber |
| Epoxy ® 4 | methylene-bis-(N,N-glycidylaniline), from Bakelite AG |
| DER RESIN ® 332 | aromatic diallyl epoxide, from Dow |
| Epoxy ® 3 | N,N-bis(2,3-epoxypropyl)4-(2,3-epoxypropoxy) aniline, from Bakelite AG |
| DER ® 732 | polyglycol diepoxide, from Dow |
| Triphenylphosphine | 97% pure, from Aldrich |
| Vestamid ® | polyamide 12, from Degussa |
| Durethan ® | polyamide 66, from Bayer AG |
| Trogamid ® | polyamide 63, from Degussa AG |
| Krynac ® X7.40 | acrylonitrile-butadiene-methacrylic acid terpolymer (XNBR), from Bayer, acrylonitrile content 26.5 wt. % |
| Vulkasil S | active silica, precipitated, pH 6, surface area approx. 175 $m^2/g$, from Bayer AG |
| Siliquest ® RC-1 Silane | vinyl silane, from Witco |
| Aluminum stearate | aluminum stearate from Riedel de Haen AG, density 0.95 $g/cm^3$ at 25° C. |
| Resin ® SP 1045 | heat-active octylphenol formaldehyde resin with methylol groups, from Schenectady International |
| Tin dichloride | >98% pure, from Fluka |

Compositions not according to the present invention, and Comparison Examples and results resulting therefrom are marked with #.

TABLE 2

Results of vulcanizing test performed on the mixtures in the Monsanto Rheometer MDR 2000 E at 170° C. and 30 min.

| Composition of mixture: | 1 | 2 | 3 | 4 | 5 | 6 | 7# | 8 | 9 | 10 | 11 | 12# |
|---|---|---|---|---|---|---|---|---|---|---|---|---|
| Therban ® VP K.A 8889 | 100 | 100 | 100 | 100 | 100 | 50 | — | 100 | 100 | 100 | 50 | — |
| Therban ® A3407 | — | — | — | — | — | 50 | 100 | — | — | — | 50 | 100 |
| Vanfre ® V AM | 1.0 | 1.0 | 1.0 | 1.0 | 1.0 | 1.0 | — | — | 1.0 | 1.0 | 1.0 | 1.0 |
| Rhenofit ® DDA-70 | 1.4 | 1.4 | 1.4 | 1.4 | 1.4 | 1.4 | 1.4 | 1.4 | 1.4 | 1.4 | 1.4 | 1.4 |
| Corax ® N 550 | 50 | 50 | 50 | 50 | 50 | 50 | 50 | 50 | 50 | 50 | 50 | 50 |
| Diplast ® TM 8-10/ST | 5 | 5 | 5 | 5 | 5 | 5 | 5 | 5 | 5 | 5 | 5 | 5 |
| Vulkanox ® ZMB2 | 0.4 | 0.4 | 0.4 | 0.4 | 0.4 | 0.4 | — | — | 0.4 | 0.4 | 0.4 | 0.4 |
| Desmodur ® 15 | 6 | — | — | — | — | — | — | — | — | — | — | — |
| Desmodur ® 44 | — | 8 | — | — | — | — | — | — | — | — | — | — |
| Desmodur ® TT | — | — | 9 | — | 5 | 5 | 9 | 9 | 9 | 5 | 5 | — |
| Rhenogran ® P-50 | — | — | — | 10 | — | — | — | — | — | — | — | — |
| Polydispersion ® T VC 40P | — | — | — | — | 5 | 5 | — | — | — | 5 | 5 | 7 |
| Perkalink ® 301 | — | — | — | — | 1.5 | 1.5 | — | — | — | 1.5 | 1.5 | 1.5 |
| Triphenylphosphine * | 1 | 1 | 1 | 1 | 1 | 1 | 1 | 1 | 1 | 1 | 1 | 1 |

The constituents of the mixture are shown as parts by weight (%) with reference to the total quantity of rubber utilized (HXNBR/HNBR).

In order to prepare the mixture the constituents were mixed on mixing rolls in the sequence rubber, fillers, stabilizers, cross-linking agents and processing aids. The roll temperature is 60° C.

The mixtures listed were examined below for vulcanizing behavior, physical properties, resistance to ageing and swelling behavior in various media.

| Mixture: | | 1 | 2 | 3 | 4 | 5 | 6 | 7# | 8 | 9 | 10 | 11 | 12# |
|---|---|---|---|---|---|---|---|---|---|---|---|---|---|
| Fmin | (dNm) | 1.4 | 1.7 | 1.7 | 2.0 | 1.5 | 1.6 | 1.6 | 6.0 | 2.1 | 1.9 | 1.9 | 1.6 |
| Fmax | (dNm) | 7.6 | 10.2 | 10.1 | 14.9 | 15.6 | 19.5 | 2.2 | 26.7 | 13.3 | 13.6 | 16.2 | 20.5 |
| Fmax − Fmin | (dNm) | 6.2 | 8.5 | 8.4 | 12.9 | 14.1 | 17.9 | 0.6 | 20.7 | 11.2 | 11.7 | 14.3 | 18.9 |
| TS 02 | (min) | 2.5 | 1.8 | 1.0. | 1.1 | 1.2 | 1.1 | — | 0.8 | 1.0 | 1.3 | 1.1 | 1.4 |
| T 10 | (min) | 0.9 | 0.9 | 0.6 | 1.0 | 0.9 | 1.0 | — | 0.8 | 0.7 | 0.9 | 0.9 | 1.3 |
| T 50 | (min) | 4.8 | 5.3 | 2.7 | 1.5 | 1.3 | 4.5 | — | 6.4 | 4.5 | 4.0 | 3.9 | 5.4 |
| T 80 | (min) | 14.9 | 15.5 | 18.3 | 2.0 | 9.1 | 9.4 | — | 17.4 | 17.9 | 8.7 | 8.3 | 11.0 |
| T 90 | (min) | 21.4 | 21.6 | 24.8 | 2.3 | 12.4 | 12.9 | — | 23.0 | 23.9 | 11.8 | 11.4 | 15.1 |
| T 95 | (min) | 25.4 | 25.4 | 27.5 | 2.6 | 15.5 | 15.9 | — | 26.2 | 26.9 | 14.6 | 14.0 | 19.0 |
| tan δ of MDR (end) | | 0.3 | 0.3 | 0.2 | — | 0.1 | 1.0 | — | 0.1 | 0.2 | 0.1 | 0.1 | 0.1 |

The increased reactivity of HXNBR-containing mixtures is clearly seen by comparison with HNBR mixtures (line Fmax−Fmin) in relation to the cross-linking activity of diisocyanates such as Desmodur® 15/44/TT as well as polycarbodiimides such as Rhenogran® P50 as well as also by comparison with peroxidic cross-linking with Polydispersion® TVC 40P.

TABLE 3

Results of physical testing of vulcanizate properties at room temperature on aged/non-aged samples.
Vulcanizate properties: ISO test piece 2 (from 2 mm sheet)

| Mixture: | | | 8 | 9 | 10 | 11 | 12# |
|---|---|---|---|---|---|---|---|
| 170° C. heating times: | (min) | | 30 | 30 | 20 | 20 | 24 |
| F | (MPa) | | 20.7 | 19 | 21 | 22 | 24 |
| D | (%) | | 200 | 425 | 370 | 345 | 365 |
| S 50 | (MPa) | | 4.3 | 3.3 | 2.2 | 2.3 | 1.6 |
| S 100 | (MPa) | | 10 | 5.6 | 4.4 | 4.9 | 4.0 |
| S 150 | (MPa) | | 15.9 | 8.3 | 7.6 | 8.9 | 8.5 |
| S 200 | (MPa) | | 20.7 | 10.9 | 11.4 | 13.4 | 13.5 |
| S 250 | (MPa) | | —/— | 13.2 | 15 | 17.3 | 18.1 |
| S 300 | (MPa) | | —/— | 15.3 | 18 | 20.6 | 21.5 |
| H (Stab) | (Shore A) | | 82 | 80 | 73 | 73 | 66 |
| Following storage in hot air at 125° C. | | | | | | | |
| F (MPa) | | zero value | 20.7 | 19.3 | 21.6 | 22.7 | 24.8 |
| F (MPa) | | 72 h | 23.1 | 21.4 | 23.9 | 23.5 | 24.7 |
| F (MPa) | | 168 h | 24.9 | 20.1 | 23.2 | 21.5 | 25.3 |
| D (%) | | zero value | 200 | 425 | 370 | 345 | 365 |
| D (%) | (%) | 72 h | 155 | 315 | 230 | 245 | 338 |
| D (%) | (%) | 168 h | 187 | 243 | 192 | 214 | 216 |
| Following storage in hot air at 150° C. | | | | | | | |
| F (MPa) | | zero value | 20.7 | 19.3 | 21.6 | 22.7 | 24.8 |
| F (MPa) | | 72 h | 24.4 | 23.9 | 22.2 | 23.3 | 26.2 |
| F (MPa) | | 168 h | 22.7 | 23.3 | 22.3 | 22 | 24.9 |
| D (%) | | zero value | 200 | 425 | 370 | 345 | 365 |
| D (%) | | 72 h | 135 | 210 | 145 | 175 | 307 |
| D (%) | | 168 h | 90 | 148 | 106 | 132 | 232 |
| Following storage in IRM oil 903 (Industry Reference OIL) at 150° C. | | | | | | | |
| F (MPa) | | zero value | 20.7 | 19.3 | 21.6 | 22.7 | 24.8 |
| F (MPa) | | 72 h | 16.0 | 16.9 | 18.0 | 18.5 | 20.8 |
| D (%) | | zero value | 200 | 425 | 370 | 345 | 365 |
| D (%) | | 72 h | 339 | 412 | 290 | 323 | 316 |
| H (Shore A) | | zero value | 82 | 80 | 73 | 73 | 66 |
| H (Shore A) | | 72 h | 62.9 | 65.8 | 61 | 58.9 | 57.2 |
| G (%) | | 72 h | 14.3 | 13.1 | 13 | 15.6 | 17.1 |
| V (%) | | 72 h | 17.9 | 16.5 | 16.4 | 19.4 | 20.3 |

TABLE 3-continued

Results of physical testing of vulcanizate properties
at room temperature on aged/non-aged samples.
Vulcanizate properties: ISO test piece 2 (from 2 mm sheet)

| Mixture: | | 8 | 9 | 10 | 11 | 12# |
|---|---|---|---|---|---|---|
| Following storage in Pentosin CHF IIS (synthetic hydraulic oil having a working temperature range of −40° C. to 130° C.) at 125° C. | | | | | | |
| F (MPa) | zero value | 20.7 | 19.3 | 21.6 | 22.7 | 24.8 |
| F (MPa) | 72 h | 18.5 | 18.5 | 22.6 | 22 | 24 |
| D (%) | zero value | 200 | 425 | 370 | 345 | 365 |
| D (%) | 72 h | 312 | 413 | 304 | 316 | 356 |
| H (Shore A) | zero value | 82 | 80 | 73 | 73 | 66 |
| H (Shore A) | 72 h | 73 | 76 | 69 | 69 | 63 |
| G (%) | 72 h | 2.96 | 2.66 | 2.22 | 3.14 | 4.20 |
| V (%) | 72 h | 5.18 | 5.10 | 4.43 | 5.57 | 6.30 |
| Storage in deionizer water at 100° C. | | | | | | |
| G (%) | 48 h | 5.20 | 5.60 | 2.60 | 2.00 | 1.30 |
| V (%) | 48 h | 5.90 | 6.10 | 2.50 | 1.80 | 1.20 |

Ageing was in a hot-air drying cabinet or by storage in various media.
In addition to tensile stress-elongation curves in accordance with DIN 53504, volume swelling and Shore A hardness in accordance with DIN 53 505 were tested.
Vulcanization was at 170° C. for the respectively indicated duration at approx. 30 bar pressure.

In combination with HXNBR the alternative cross-linking systems based on diisocyanates generate comparable physical properties to classic peroxidic cross-linking systems for HNBR. A combination of different cross-linking systems and a markedly wider selection of fields of application is possible in the case of HXNBR in the presence of molecularly dissolved triphenylphosphine.

TABLE 4

Formulations for cross-linking of HXNBR mixtures with diisocyanate,
in some cases in the presence of a peroxidic cross-linking
system by comparison with standard HNBR rubber

| Composition of mixture: | 13 | 14 | 15# |
|---|---|---|---|
| Therban ® VP KA 8889 | 100 | 50 | |
| Therban ® A 3407 | | 50 | 100 |
| Vanfre ® VAM | | 1 | 1 |
| Rhenofit ® DDA-70 | 1.4 | 1.4 | 1.4 |
| Corax ® N 550 | 50 | 50 | 50 |
| Diplast ® TM 8-10/ST | 5 | 5 | 5 |
| Vulkanox ® ZMB2 | | 0.4 | 0.4 |
| Desmodur ® TT | 9 | 5 | |
| Polydispersion ® T VC 40P | | 5 | 7 |
| PERKALINK ® 301 | | 1.5 | 1.5 |
| Triphenylphosphine* | 1 | 1 | 1 |

The constituents of the mixture are indicated in parts by weight (%) in relation to the total quantity of rubber utilized (HXNBR/HNBR).

In order to prepare the mixture the constituents were mixed on mixing rolls in the sequence rubber, fillers, stabilizers, cross-linking agents and processing aids.
The roll temperature is 60° C.

TABLE 5

Results of vulcanizing tests performed on the mixtures in a
Monsanto Rheometer MDR 2000 E at 170° C. and 30 min.

| Mixture: | | 13 | 14 | 15# |
|---|---|---|---|---|
| Fmin | (dNm) | 6.8 | 1.8 | 1.6 |
| Fmax | (dNm) | 35.7 | 20.8 | 21.5 |
| Fmax − Fmin | (dNm) | 28.9 | 19 | 19.9 |
| TS 02 | (min) | 0.52 | 1.01 | 1.3 |
| T 10 | (min) | 0.6 | 1 | 1.3 |
| T 50 | (min) | 3.1 | 4.3 | 5.3 |
| T 80 | (min) | 10.7 | 9.2 | 10.9 |
| T 90 | (min) | 17.2 | 12.6 | 14.9 |
| T 95 | (min) | 22.4 | 15.7 | 18.8 |
| tan δ of MDR (end) | | 0.04 | 0.09 | 0.06 |

The reactivity of HXNBR-containing mixtures was clearly seen by comparison with HNBR mixtures, showing that with HXNBR in combination with isocyanates cross-linking densities (see Fmax−Fmin) can be obtained which are comparable to, and even higher than, the cross-link densities known from classic peroxide cross-linking systems. Simultaneous utilization of cross-linking systems based on peroxide and isocyanate was recorded in relation to the cross-linking activity of diisocyanates such as Desmodur® TT and also by comparison with peroxidic cross-linking with Polydispersion® TVC 40P.

TABLE 6

Results of adhesion testing of elastomer mixtures
13-14 on various thermoplastic tires.

| Mixture: | | 13 | 14 | 15# |
|---|---|---|---|---|
| Bond strength at 23° C./Pull-off speed 100 mm/min | | | | |
| Vestamid sheets | F-Max = moment of the initial force | | | |
| F-Max | N/25 mm | 27 | 56 | 9 |
| Bond strength as a median value | N/25 mm | 12 | 13 | 9 |
| Durethan sheets | | | | |
| F-Max | N/25 mm | 26 | 41 | 26 |
| Bond strength as a median value | N/25 mm | 22 | 22 | 16 |

TABLE 6-continued

Results of adhesion testing of elastomer mixtures 13-14 on various thermoplastic tires.

| Mixture: | | 13 | 14 | 15# |
|---|---|---|---|---|
| Trogamid ® sheets | | | | |
| F-Max | N/25 mm | 44 | 88 | 8 |
| Bond strength as a median value | N/25 mm | 41 | 25 | 7 |

The bond strengths were determined at 23° C., deviating from DIN 53 531, at a pull-off speed of 100 mm/min. The specimens were vulcanized at 170° C. for 30 min at approx. 30 bar.

In the presence of HXNBR (Therban® KA8889) higher adhesion values were obtained to the various polyamides than are obtained with non-carboxylated HNBR (Therban® A 3407).

TABLE 7

Formulations for the cross-linking of HXNBR mixtures with various epoxides and different quantities of triphenylphosphine.

| Composition of mixture: | 16 | 17 | 18 | 19 | 20 | 21 | 22 | 23 | 24 | 25 | 26 | 27 | 28 | 29 |
|---|---|---|---|---|---|---|---|---|---|---|---|---|---|---|
| Therban ® KA 8889 | 100 | 100 | 100 | 100 | 100 | 100 | 100 | 100 | 100 | 100 | 100 | 100 | 100 | 100 |
| Rhenofit ® DDA-70 | 1.4 | 1.4 | 1.4 | 1.4 | 1.4 | 0.4 | 0.4 | 0.4 | 0.4 | 0.4 | 0.4 | 0.4 | 0.4 | 0.4 |
| Corax ® N 550 | 50 | 50 | 50 | 50 | 50 | 50 | 50 | 50 | 50 | 50 | 50 | 50 | 50 | 50 |
| Vulkanox ® ZMB2/C5 | | | 0.4 | 0.4 | 0.4 | 1.4 | 1.4 | 1.4 | 1.4 | 1.4 | 1.4 | 1.4 | 1.4 | 1.4 |
| Diplast ® TM 8-10/ST | | | 5 | 5 | 5 | 5 | 5 | 5 | 5 | 5 | 5 | 5 | 5 | 5 |
| Epoxy ® 4 | | | 5 | 5 | 5 | | | | | | | | | |
| DER Resin ® 332 | 5 | 10 | | | | | | | 10 | 10 | 10 | | | |
| Epoxy ® 3 | | | | | | 5 | 5 | 5 | | | | | | |
| DER ® 732 | | | | | | | | | | | | 5 | 5 | 5 |
| Triphenylphosphine* + Triphenylphosphine | 1 | 1 | 1 | 1 + 2 | 1 + 4 | 1 | 1 + 2 | 1 + 4 | 1 | 1 + 2 | 1 + 4 | 1 | 1 + 1 | 1 + 2 |

The constituents of the mixture are indicated as parts by weight (%) in relation to the total quantity of rubber utilized (HXNBR/HNBR).

In order to prepare the mixture the constituents were mixed on mixing rolls in the sequence rubber, fillers, stabilizers, cross-linking agents and processing aids.

The roll temperature is 60° C.

TABLE 8

Results of vulcanizing tests performed on the mixtures in a Monsanto Rheometer MDR 2000 E at 200° C. and 30 min.

| | Monsanto Rheometer MDR 2000 E: 200° C. | | | | | | | | | | | | | |
|---|---|---|---|---|---|---|---|---|---|---|---|---|---|---|
| Mixture: | 16 | 17 | 18 | 19 | 20 | 21 | 22 | 23 | 24 | 25 | 26 | 27 | 28 | 29 |
| Fmin(dNm) | 0.8 | 0.8 | 6.9 | 7.4 | 10.4 | 5.6 | 15.5 | 23.0 | 1.1 | 25.1 | 27.0 | 0.9 | 0.9 | 0.9 |
| Fmax (dNm) | 20.3 | 35 | 38.5 | 27.2 | 26.5 | 38.5 | 34.9 | 34.2 | 32 | 35.9 | 31.6 | 6.9 | 10.6 | 10.6 |
| Fmax − Fmin (dNm) | 19.5 | 34.2 | 31.6 | 19.8 | 16.1 | 32.9 | 19.4 | 11.2 | 30.9 | 10.8 | 4.6 | 6 | 9.7 | 9.7 |
| TS 02(min) | 5.2 | 3.4 | 0.8 | 0.9 | 0.9 | 0.9 | 0.7 | 0.8 | 2.4 | 0.8 | 1 | 10.5 | 4.1 | 2.2 |
| T 10(min) | 5.1 | 4.6 | 0.9 | 0.9 | 0.8 | 1 | 0.7 | 0.7 | 3.1 | 0.7 | 0.7 | 4.1 | 2.8 | 1.6 |
| T 50(min) | 14.4 | 13 | 2.4 | 2.2 | 1.8 | 3.2 | 1.4 | 1.2 | 11.1 | 1.3 | 1.1 | 14.7 | 7.6 | 3.7 |
| T 80(min) | 22.4 | 21.3 | 5.4 | 4.5 | 3.4 | 8.6 | 3.3 | 2.7 | 19.9 | 4.1 | 2.6 | 23.1 | 14 | 6.9 |
| T 90(min) | 25.8 | 25.2 | 8.3 | 6.6 | 4.8 | 14.2 | 5.7 | 4.4 | 24.2 | 8.5 | 4.5 | 26.5 | 18.8 | 9.8 |
| T 95(min) | 27.8 | 27.4 | 11.5 | 9.1 | 6.7 | 19.8 | 9.1 | 6.9 | 26.9 | 13.9 | 7.1 | 28.2 | 22.9 | 13.4 |
| tan δ of MDR (end) | 0.07 | 0.02 | 0.02 | 0.03 | 0.03 | 0.02 | 0.02 | 0.02 | 0.03 | 0.01 | 0.01 | 0.24 | 0.15 | 0.14 |

Table 8 shows the influence of the respective epoxy type, the quantity of epoxide used and the quantity of triphenylphosphine utilized on the cross-linking speed and cross-link density of HXNBR with epoxides. Only in the presence of activators was cross-linking of HXNBR with the epoxides which are listed successful at acceptable temperatures $\leq 200°$ C. and within acceptable times (T 95)$\leq$30 min.

TABLE 9

Results of physical tests on vulcanizate properties at room temperature.
Vulcanizate properties: ISO test piece 2 (from 2 mm sheet) at 23° C.

| Mixture: | | 21 | 22 | 23 | 24 | 25 | 26 | 27 | 28 | 29 |
|---|---|---|---|---|---|---|---|---|---|---|
| 200° C. heating times: | (min) | 35 | — | — | 40 | — | — | — | — | — |
| 180° C. heating times: | (min) | — | 15 | 15 | — | 15 | 15 | 40 | 30 | 25 |
| F | (MPa) | 21.8 | 10.6 | 9 | 20.5 | 11.1 | 12.5 | 18.1 | 18.9 | 20.1 |
| D | (%) | 143 | 74 | 68 | 196 | 82 | 97 | 613 | 621 | 667 |
| S 25 | (MPa) | 1.7 | 1.8 | 2 | 1.6 | 1.9 | 1.9 | — | — | — |
| S 50 | (MPa) | 4 | 5 | 5 | 3.2 | 4.5 | 4.1 | 1.5 | 1.5 | 1.4 |
| S 75 | (MPa) | 7.8 | 10.8 | 10.8 | 5.7 | 9.3 | 8 | — | — | — |
| S 100 | (MPa) | 13.0 | — | — | 8.9 | — | 13.3 | 2.4 | 2.5 | 2.3 |
| H (3 × 2 mm test piece) | (Shore A) | 75 | 76 | 74 | 72 | 76 | 72 | 63 | 63 | 61 |

In addition to tensile stress-elongation curves in accordance with DIN 53504 the Shore A hardness in accordance with DIN 53 505 is tested. Vulcanizing was at 180/200° C. for the duration indicated in each case, at approx. 30 bar pressure.

Polyfunctional epoxides can react with HXNBR in the presence of suitable activators, with cross-linking. The quantity of activator can be kept to a minimum by the utilization of molecularly dissolved triphenylphosphine.

TABLE 10

Formulations for the cross-linking of HXNBR and XNBR mixtures with various quantities of polyvalent ions (aluminum stearate) and various fillers (carbon black/silica).

| Composition of mixture: | 30 | 31 | 32 | 33 | 34# | 35# | 36# | 37# | 38 | 39 |
|---|---|---|---|---|---|---|---|---|---|---|
| Therban ® KA 8889 | 100 | 100 | 100 | 100 | — | — | — | — | 100 | 100 |
| Krynac ® X7.40 | — | — | — | — | 100 | 100 | 100 | 100 | — | — |
| Rhenofit ® DDA-70 | 1.4 | 1.4 | 1.4 | 1.4 | 1.4 | 1.4 | 1.4 | 1.4 | — | — |
| Corax ® N 550 | 50 | 50 | 50 | 50 | 50 | 50 | 50 | 50 | — | — |
| Vulkasil ® S | — | — | — | — | — | — | — | — | 50 | 50 |
| Vanfre ® VAM | — | — | — | — | — | — | — | — | 1 | 1 |
| Diplast ® TM 8-10/ST | — | — | — | — | — | — | — | — | 10 | 10 |
| Silquest ® RC-1 Silane | — | — | — | — | — | — | — | — | 4 | 4 |
| Aluminum stearate | 1 | 2 | 4 | 8 | 1 | 2 | 4 | 8 | 2 | 8 |
| Triphenylphosphine * | 1 | 1 | 1 | 1 | — | — | — | — | 1 | 1 |

The constituents of the mixture are indicated as parts by weight (%) in relation to the total quantity of rubber utilized (HXNBR/XNBR).

In order to prepare the mixture the constituents were mixed on mixing rolls in the sequence rubber, fillers, stabilizers, cross-linking agents and processing aids.

The roll temperature was 60° C.

TABLE 11

Results of vulcanizing tests performed on the mixtures in a Monsanto Rheometer MDR 2000 E at 160° C. and 30 min.

| | Monsanto Rheometer MDR 2000 E: 160° C. | | | | | | | | | |
|---|---|---|---|---|---|---|---|---|---|---|
| Mixture: | 30 | 31 | 32 | 33 | 34# | 35# | 36# | 37# | 38 | 39 |
| Fmin (dNm) | 2.6 | 3.4 | 5.0 | 4.1 | 1.7 | 2.2 | 3.3 | 4.8 | 5.8 | 9.2 |
| Fmax (dNm) | 3.8 | 6.2 | 10.9 | 18.7 | 3.1 | 4.5 | 8.2 | 14.6 | 8.7 | 13.3 |
| Fmax − Fmin (dNm) | 1.2 | 2.8 | 5.9 | 14.6 | 1.4 | 2.3 | 4.9 | 9.8 | 2.9 | 4.1 |
| TS 02(min) | — | 10.2 | 1.3 | 0.07 | — | 19.6 | 3.1 | 0.9 | 0.4 | 0.3 |
| T 10(min) | 0.8 | 0.5 | 0.5 | 0.06 | 0.8 | 0.8 | 0.6 | 0.6 | 0.2 | 0.2 |
| T 50(min) | 7.9 | 4.5 | 2.7 | 1 | 5 | 5.4 | 4.6 | 3.3 | 0.3 | 0.3 |
| T 80(min) | 18.3 | 13 | 9 | 4.5 | 14.7 | 15.7 | 14.4 | 11 | 0.4 | 0.4 |

TABLE 11-continued

Results of vulcanizing tests performed on the mixtures in a
Monsanto Rheometer MDR 2000 E at 160° C. and 30 min.

Monsanto Rheometer MDR 2000 E: 160° C.

| Mixture: | 30 | 31 | 32 | 33 | 34# | 35# | 36# | 37# | 38 | 39 |
|---|---|---|---|---|---|---|---|---|---|---|
| T 90(min) | 23.1 | 19 | 14.4 | 8.9 | 21.2 | 21.9 | 24.6 | 22.2 | 0.5 | 0.5 |
| T 95 (min) | 25.9 | 23.2 | 19.4 | 14.8 | 25 | 25.5 | 24.6 | 22.2 | 0.6 | 0.6 |
| tan δ of MDR (end) | 0.56 | 0.36 | 0.21 | 0.18 | 0.6 | 0.4 | 0.3 | 0.2 | 0.58 | 0.33 |

As the aluminum stearate content increases the cross-link density increases. This effect was more pronounced for HXNBR than for XNBR. Higher cross-link densities and higher cross-linking speeds were obtained with HXNBR, although a higher concentration of carboxyl groups is present in the NBR (7% by contrast with 5% in the HXNBR).

TABLE 12

Results of physical tests on the vulcanizate properties at room temperature.
Vulcanizate properties: ISO test piece 2 (from 2 mm sheet) at 23° C.

| Mixture: | 30 | 31 | 32 | 33 | 34# | 35# | 36# | 37# | 38 | 39 |
|---|---|---|---|---|---|---|---|---|---|---|
| 160° C. heating times: (min) | 30 | 30 | 25 | 20 | 30 | 30 | 30 | 30 | 30 | 30 |
| F (MPa) | 8 | 10.4 | 12 | 15.4 | 0.7 | 2.3 | 5.5 | 9.4 | 2.4 | 9.6 |
| D (%) | 892 | 766 | 548 | 397 | 1315 | 961 | 471 | 251 | 1713 | 675 |
| S 100(MPa) | 2.0 | 2.3 | 3.6 | 7.2 | 1 | 1.4 | 2.4 | 5.5 | 0.8 | 2.2 |
| S 200(MPa) | 3.2 | 3.9 | 6.6 | 12.3 | 1.1 | 1.9 | 4 | 8.7 | 0.71 | 3.1 |
| S 300(MPa) | 4.5 | 5.7 | 9.4 | 14.7 | 1.2 | 2.3 | 5.2 | — | 0.7 | 4.2 |

In addition to tensile stress-elongation curves in accordance with DIN 53504, the Shore A hardness in accordance with DIN 53505 was tested. Vulcanizing was at 160° C. for the duration indicated in each case at approx. 30 bar pressure.

Carboxyl group-containing polymers such as XNBR (carboxylated nitrile-butadiene rubber) and HXNBR can react with polyvalent ions, with cross-linking. Surprisingly, with HXNBR in the presence of molecularly dissolved triphenylphosphine markedly superior physical properties such as tensile strength and modulus at different elongations (for example S 100=modulus at 100% elongations, etc.) can be achieved to those that are achievable with XNBR.

TABLE 13

Formulations for the cross-linking of HXNBR and HNBR mixtures
with formaldehyde-phenol cross-linking systems.

| Composition of mixture | 40# | 41 |
|---|---|---|
| Therban ® A 3407 | 100 | |
| Therban ® KA 8889 | | 100 |
| Rhenofit ® DDA-70 | 1.4 | 1.4 |
| Corax ® N 550 | 50 | 50 |
| Resin ® SP1 045 | 4 | 4 |
| Tin dichloride | 0.5 | 0.5 |
| Triphenylphosphine* | 1 | 1 |

The constituents of the mixtures are indicated as parts by weight (%) in relation to the total quantity of rubber utilized (HXNBR/HNBR)

In order to prepare the mixture the constituents were mixed on mixing rolls in the sequence rubber, fillers, stabilizers, cross-linking agent and processing aids.

The roll temperature was 60° C.

TABLE 14

Results of vulcanizing tests performed on the mixtures in
a Monsanto Rheometer MDR 2000 E at 160° C. and 30 min.
Monsanto Rheometer MDR 2000 E: 160° C.

| Mixture: | | 40# | 41 |
|---|---|---|---|
| Fmin | (dNm) | 2.5 | 2.1 |
| Fmax | (dNm) | 8.9 | 18.2 |
| Fmax – Fmin | (dNm) | 6.4 | 16.1 |
| TS 02 | (min) | 7.9 | 1.4 |
| T 10 | (min) | 3 | 1.2 |
| T 50 | (min) | 12.4 | 4 |
| T 80 | (min) | 21.5 | 8.3 |
| T 90 | (min) | 25.4 | 12.4 |
| T 95 | (min) | 27.7 | 17.3 |
| tan δ of MDR (end) | | 0.34 | 0.12 |

HXNBR has a markedly higher cross-linking speed and cross-link density than HNBR when cross-linked by heat-activatable formaldehyde-phenol cross-linking systems such as are typically used for the cross-linking of, for example, butyl rubber (isoprene-isobutylene copolymer) but not for the cross-linking of HNBR.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for crosslinking an elastomer(s), a plastic(s) or an adhesive system(s) comprising the step of adding a crosslinking agent to the elastomer(s), plastic(s) or adhesive system wherein the crosslinking agent comprises a hydrogenated carboxylated nitrile butadiene rubber (HXNBR) that has a triphenylphosphine molecularly dispersed therein, such that no difference in concentration occurs between the HXNBR and the triphenylphosphine on a dimensional scale greater than 1 micrometer.

2. Process for a preparation of the composition comprising the steps of
   a) providing an HXNBR rubber which comprises molecularly dispersed triphenylphosphine such that no difference in concentration occurs between the HXNBR and the triphenylphosphine on a dimensional scale greater than 1 micrometer, and which prepared by the hydrogenation of an XNBR rubber prepared by means of emulsion polymerization, and
   b) mixing the HXNBR rubber with further activators, wherein at least one activator is a non-molecularly dispersed activator.

3. A process according to claim 1, wherein the elastomer has a glass transition point below room temperature.

4. A process according to claim 3, wherein the elastomer is selected from the group consisting of polychloroprene, ethylene propylene diene rubber, polyacrylates, polybutadienes, polyacrylonitrile butadiene, fluororubbers, chlorosulfonated rubbers, halogenated and unhalogenated butyl rubber and styrene butadiene rubber.

5. A process according to claim 1, wherein the plastic is selected from the group consisting of polyurethanes, polyureas, polyesters, polyamides, polyacrylates, polymethacrylates, polyepoxides and polyepichlorohydrins.

6. The process according to claim 1, wherein the adhesive system is prepared from bifunctional or polyfunctional epoxides, thiiranes, isocyanates, carbodiimides in combination with bifunctional or polyfunctional amines, alcohols, carboxylic acids, formaldehyde-phenolic resins, and products which arise from the reaction of cross-linkable functional (meth)acrylates and/or rubbers with radical generators.

7. The process according claim 1, wherein the adhesive system is an ionic network having basic frameworks selected from the group consisting of polyfunctional sulfonates, polyfunctional carboxylates, polyfunctional nitrogen compounds, polyfunctional phosphorus compounds and chelate compounds, which are reacted with strongly polar ions.

8. The process according to claim 6, wherein the radical generators are selected from the group consisting of photoinitiators, peroxides, azides and redox initiators.

9. The process according to claim 7, wherein the ionic network is a combination of polyfunctional sulfonates, carboxylates, polyfunctional nitrogen compounds, polyfunctional phosphorus compounds or polyfunctional chelate compounds having strongly polar ions.

* * * * *